United States Patent [19]

Bingham et al.

[11] Patent Number: 5,745,895

[45] Date of Patent: Apr. 28, 1998

[54] METHOD FOR ASSOCIATION OF HETEROGENEOUS INFORMATION

[75] Inventors: Ronald E. Bingham, Capitola; Harry R. Campbell, Los Gatos; Michael J. Dockter, Hollister; Joel F. Farber, San Jose, all of Calif.; Kevin D. Seppi, Austin, Tex.

[73] Assignee: International Business Machines Corporation, Armonk, N.Y.

[21] Appl. No.: 262,838

[22] Filed: Jun. 21, 1994

[51] Int. Cl.⁶ .................................................. G06F 17/30
[52] U.S. Cl. ........................ 707/10; 707/3; 707/104; 707/500; 707/501; 395/50
[58] Field of Search ............................ 395/600, 650, 395/50; 707/10, 3, 104, 500, 501

[56] References Cited

U.S. PATENT DOCUMENTS

| | | | |
|---|---|---|---|
| 4,905,163 | 2/1990 | Garber et al. | 364/513 |
| 4,914,586 | 4/1990 | Swinehart et al. | 364/200 |
| 4,930,071 | 5/1990 | Tou et al. | 364/300 |
| 5,241,671 | 8/1993 | Reed et al. | 395/600 |
| 5,408,655 | 4/1995 | Oren et al. | 395/600 |
| 5,418,844 | 5/1995 | Morrisey et al. | 379/207 |
| 5,563,939 | 10/1996 | La Porta et al. | 379/220 |
| 5,644,686 | 7/1997 | Hekmatpour | 395/50 |

FOREIGN PATENT DOCUMENTS

| | | | |
|---|---|---|---|
| 467591 | 1/1992 | European Pat. Off. | 15/40 |
| 501770 | 2/1992 | European Pat. Off. | 15/419 |
| 483576 | 5/1992 | European Pat. Off. | 15/40 |
| 483577 | 5/1992 | European Pat. Off. | 15/40 |
| 10913 | 9/1990 | WIPO | 15/419 |

OTHER PUBLICATIONS

Bernstein et al, European Patent Application: 0 483 567 A2, "Application Independent Services Enabling the Incorporation of Hypermedia", Jan. 1992.

7.0 Appendix A. Related Industry Acticles / Data, 7.1 Hypertext Requirements, No date.

*Primary Examiner*—Thomas G. Black
*Assistant Examiner*—Cheryl R. Lewis
*Attorney, Agent, or Firm*—Randy W. Lacasse; David J. Kappos; Marilyn Smith Dawkins

[57] ABSTRACT

A coherent method for the creating, capturing, and retrieving of ideas, concepts, data, and/or multi-media information The system establishes a framework in which knowledge can be represented. The system is a computer-based system which utilizes multimedia, databases, and mass storage to implement this framework. It has an architecture and an open-ended-set of functional elements that combine to support knowledge processing. Knowledge is created by uniquely identifying and interrelating heterogeneous datasets located locally on a user's workstation or dispersed across computer networks. By uniquely identifying and storing the created interrelationships, the datasets themselves need not be locally stored. Datasets may therefore be located, interrelated and accessed across computer networks. In addition, an almost unlimited number of relationships can be created and stored as knowledge to be selectively filtered and collected by the end user.

44 Claims, 3 Drawing Sheets

CONNECTIONS (C) REPRESENT OBSERVATIONS.
PHENOMENA (P) REPRESENT THINGS OBSERVED

When discussing one particular phenomena, connections are either inbound or outbound. "OUTBOUND connections" are shown in heavy

EXPAND & CONTRACT CONNECTIONS
EXPAND shows the connections outbound from the phenomena pointed to by the selected connection.
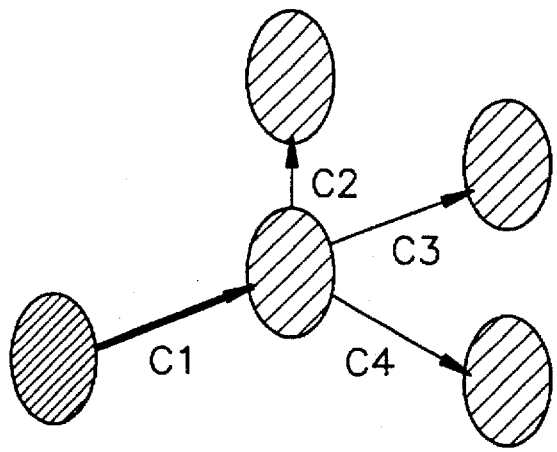
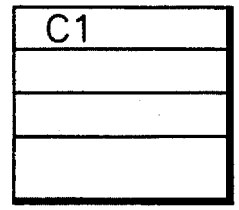
FIG. 1c
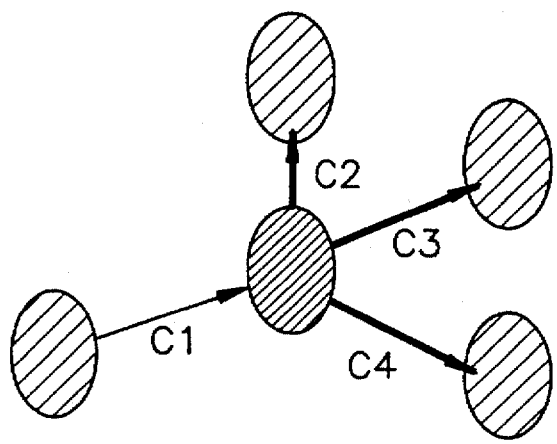
FIG. 1d
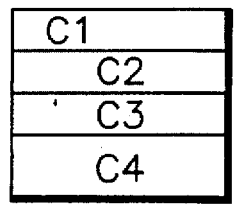

Simplified Knowledge Cycle

Dependencies

METHOD FOR ASSOCIATION OF HETEROGENEOUS INFORMATION

BACKGROUND OF THE INVENTION

FIELD OF INVENTION

The present invention relates generally to the recognition and collection of the relationships between information sources. More particularly, the present invention is directed to a method and apparatus for the interrelating of various forms of identified sets of data by establishing links therebetween, storage of said links and related data and the subsequent retrieval and review thereof.

RELATED MATERIALS

This application is related to the following co-pending applications which are hereby incorporated by reference:
UNIVERSAL TAG IDENTIFIER ARCHITECTURE— Ser. No. 07/963,885, now U.S. Pat. No. 5,414,841
METHOD FOR GENERATING CONNECTIONS BETWEEN OBJECTS IN A COMPUTER NETWORK(GRINDING) Ser. No. 08/262,999 now U.S. Pat. No. 5,608,900,
FACILITY FOR THE INTELLIGENT SELECTION OF INFORMATION OBJECTS (PERSONA) Ser. No. 08/262,834, pending,
FACILITY FOR THE STORAGE AND MANAGEMENT OF INFORMATION OBJECTS (NOUMENA SERVER) Ser. No. 08/263,146, now U.S. Pat. No. 5,557,790,
FACILITY FOR THE STORAGE AND MANAGEMENT OF CONNECTIONS (CONNECTION SERVER) Ser. No. 08/272,022, now abandoned and continued into U.S. Pat. No. 08/741,291, pending and
METHOD FOR STORING AND RETRIEVING HETEROGENEOUS CLASSIFICATION SYSTEMS Ser. No. 08/263,379, now U.S. Pat. No. 5,678,038.

Throughout history the quest for knowledge has always been slowed by the inability to quickly and easily locate information related to a particular subject of interest. The creation of libraries illustrates a first, best attempt, to consolidate large quantities of information in a limited physical space. Once the documents were collected, the information contained therein went through some type of indexing to link common subject matter by type of information, author, source, etc.

The limitations of the library system are many. If the particular information sought by a user is not present within the confines of the building, the information cannot be located directly. A person wishing to locate information is severely restricted by their own personal skill in using the established index system, by their lack of knowledge or understanding of the particular subject matter, language barriers and/or format for retrieval (i.e. microfiche retrieval) An additional limiting factor for locating information is time. For an individual to search exhaustively, exploring all leads and leads therefrom can be overwhelmingly time consuming.

With the evolution of the computer age, has come the creation of immense databases of computer coded sources. Computer coded sources include: books and other written materials, audio and video recordings, computer programs, data files, etc. With the transference of traditional information sources into computer coded sources, comes the responsibility of accessibility.

Prior art attempts to access computer database information have included methods for key word and key-word-in-context searching. As with the library system, many limitations still exist. The information that a person is attempting to locate must be within the confines of the logical library created by a commercial database or on a smaller scale in the database accessible within the requesters computer workstation. The types of data accessible within a workstation are to include, database files, CD-ROM, portable magnetic media, etc.

Like the library system, a requester is still severely limited by their skill in using the indexing system and additionally their limited knowledge of word searching. The user may lack a full understanding of the logic that is the basis for word searching and are further hindered by their lack of knowledge of the subject, its terminology, and equivalents (i.e. across disciplines, cultures, languages, etc.). Databases have an almost unlimited incongruency in their individual specific logic and syntax requirements. Such incongruencies lead to an inability to index data across networks, especially those of mixed media types.

To summarize:

Acquiring knowledge on a subject requires knowing what ideas, concepts, data and multi-media information are related to the subject of interest.

Locating ideas, concepts, and information is generally inefficient because there exists no coherent method for:

Acquiring, representing, managing, and extracting value from the diverse set of existing data, unstructured information, and multi-media data.

Locating ideas, concepts, and information related to a given subject.

Exploiting the various forms of captured knowledge (e.g. books, audio-video recordings, computer programs and data).

Wading through the many sources of information; the volume of data is tremendous.

Using the various forms of captured knowledge in concert effectively.

Assessing which related information is most important.

DISCUSSION OF PRIOR ART

Many attempts to solve some of the problems as outlined above have been made to this point with limited success. General purpose connection servers for Hypertext or Hypermedia systems are not presently available. Existing Hypertext systems are closed. Their links are private and proprietary. They hide their links of data objects from view, modification, and adaptation to other uses. The existing link structures are inflexible, difficult to extend and generalize. As these current systems evolve, they are having significant problems with migration, versioning, and general storage management.

The following descriptions provide some insight as to the attempts of prior systems to connect objects and manage the results thereof. The prior art is deficient with respect to providing efficient and accessible storage and retrieval of knowledge obtained during the course of trying to link information objects.

HYPERTEXT/HYPERMEDIA

Hypertext, and its multimedia counterpart hypermedia, are methods used by programmers to interconnect references to additional related sources. Hypertext programmers usually store maps of selected links for a particular application within the application itself. The limitations of Hypertext are its static authoring linking process, rapid development of large volumes of data and its inability to crosslink easily to remotely located, and incompatible, sources of information. The most beneficial uses of hypertext/hypermedia are restricted to the workstation level.

Entity-Relationship Model

Chen developed the "Entity-Relationship Model". Chen sought to model the relationships universal to a class of entities. His goal was to unify data models for the rigid, predefined, structure provided in database systems. The system fails to provide for a dynamic individualized method to interrelate instances of information, but rather is directed to relating entire classes of information.

HYPERFLEX

HYPERFLEX is a hypertext system developed by Craig Kaplan and Greg Wolf of IBM. The HYPERFLEX system restricts objects to text. It has a fixed set of objects and can not augment the set of objects (text). Nodes are fully connected in HYPERFLEX, leading to a combinatorial explosion in the number connections and therefore in processing time when the number of nodes becomes large. For each of these connections there is a value stored, one for each user (or user class) HYPERFLEX does not track the attributes which describe connections between objects. Additionally the system is not intended for use on a distributed network.

Rosebud

Rosebud was a customized newspaper system developed by Apple Computer. Rosebud is essentially a passive retrieval system, the user cannot dynamically add new objects of interest from outside the domain of what is provided.

Rosebud's reporters find information like a 'Grinder', defined below, but it seems to provide no permanent structure in which to store these associations for use by other users.

The reporters find information of interest to the user but must do so with little or no meta-data as provided in the present invention. Rosebud is not heuristic in that it does not evolve its extraction criteria by "watching" the user.

As seen by the above descriptions a need exists for a universally compatible and accessible method/apparatus for obtaining and using links of data objects, especially in the ever expanding world of multi-media.

OBJECTS OF THE INVENTION

An object of the present invention is to manage the structure that ties people, things, places and concepts together in support of creative activities.

Additionally, it is an object of the present invention to use uniquely identified sources of data.

Another object of the present invention is to link automatically the recognized uniquely identified sources of data using unused computer cycles.

It is further an object of the present invention to create the links based on either preferential profiles of the user and/or developed computer knowledge profiles.

It is also the object of the present invention to collect, track and store the links created between the various sources of data.

It is also an object of the present invention to develop a unique method of handling classifications.

It is further an object of the present invention to provide a means to interface the user with the developed link knowledge.

These and other objects will be discussed hereafter as related to the drawings, detailed specification and claims.

SUMMARY OF THE INVENTION

The system of the present invention provides for a coherent method for the creating, capturing, and retrieving of ideas, concepts, data, and/or multi-media information. The system establishes a framework in which knowledge can be represented. The system is a computer-based system which utilizes multimedia, databases, and mass storage to implement this framework. It has an architecture and an open-ended set of functional elements that combine to support knowledge processing.

The purpose of this computer-based representation is to allow the user, a person, to observe worldly phenomena; deriving benefit from the phenomena as it enters the human understanding. The system considers this the delivery mechanism for knowledge. In the system model, a unique method exists of logical knowledge representation, storage, manipulation, and access.

The Nature of Knowledge

Knowledge comes from our ability to understand phenomena. A key way to acquire knowledge is observation, especially relating the observations in contexts. Knowledge can be thought of as the relationships between the pieces of information. The system has a unique method representing (recording) knowledge by "observations" made in a structured way (suitable for computer processing). Here is a model of the way people create and deal with knowledge:

> Assume a base of some knowledge. FIG. 2 illustrates, at the highest level of abstraction, a description of the Knowledge Cycle:
> Knowledge is retrieved (you get some, analyze it . . . )
> Knowledge (your new observations, new realizations, new connections between prior objects/phenomena) is created
> Knowledge is captured and recorded.
> Cycle around and utilize the new knowledge, and continue to cycle.

The system has a logical structure which is perceived by the user of the system and a physical structure which is hidden from the user. The logical structure consists of the use of "Phenomena", "Connections", "Connection Attributes" and "Noumena" concepts, discussed hereafter. The system has a physical structure which is the basis for its computer implementation. The physical structure comprises the proper management of the physical embodiments of Phenomena, Connections, Connection Attributes, Tags and Noumena concepts.

The logical structure of the system will be discussed hereafter, highlighting the synergy and cooperation of its elements. The rudiments of the physical structure of the system are introduced, but are explained in detail in the previously cited co-pending applications.

BRIEF DESCRIPTION OF THE DRAWINGS

FIG. 1c and FIG. 1d, collectively, illustrate expansion and contraction of multiple connections.

DETAILED DESCRIPTION OF INVENTION

The structure of the present invention is best described by the collection of the basic elements that make-up the system. The following are definitions and descriptions of these principles:

Tags: Tags are globally unique identifiers. Tags are uniquely numbered identifiers identifying data objects (i.e. video, text, audio, observations, opinions, etc.)

Phenomena: The logical structure of the system begins with a unit of human perception, the "phenomena". In the universe of human experience, phenomena are that which stimulate the senses or the thought process. They are that which can enter human understanding. This is how philosophers define phenomena.

In the universe of a computer system, "Phenomena" is defined as a representation of phenomena which exist in the universe of human experience. Phenomena can be written matter, videos computer data, etc. These phenomena are uniquely identifiable by a "Tag" (ref. Tag Application) and can be in the form of a multimedia recreation of the phenomena, a referral to where this phenomena exists, or simply a description of the phenomena. Other representations are possible.

Simply observing all Phenomena is not a practical way to acquire knowledge of a subject. The reason: there are more phenomena in the universe of human experience than a human could ever have time to observe. Also, not all phenomena provide value in acquiring knowledge on a selected subject. The next component of the logical structure of the system, "Connections", helps the user determine which Phenomena should be experienced to acquire knowledge on a subject.

Connections: That which gathers (or links) Phenomena into interrelated collections. Philosophers have espoused that isolated concepts are valueless. Only when one understands the associations among concepts, the collection, does one have knowledge.

Connections are that which lead the user from one Phenomena to another Phenomena. An example of a connection might further facilitate understanding of this concept. A first phenomena, a technical description of a particular brand of laptop computer and a second phenomena, a magazine article on the top ten laptop computers, could be linked by a connection which identifies the inclusion of the laptop computer in the article or conversely, could be linked because it was not included. For either situation, the connection creates a value link from the technical description to the article.

Figure 1A:
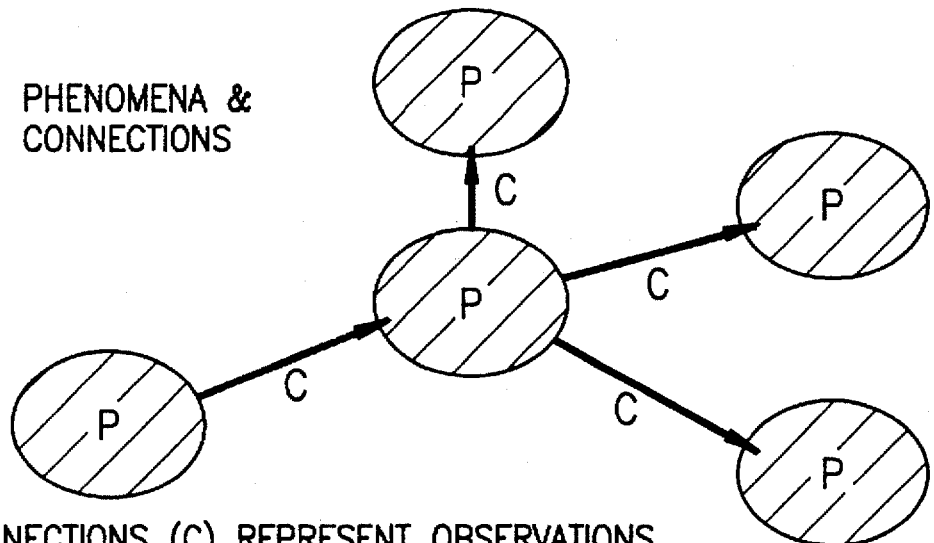
FIG. 1a, illustrates basic phenomena connections.
Figure 1B:
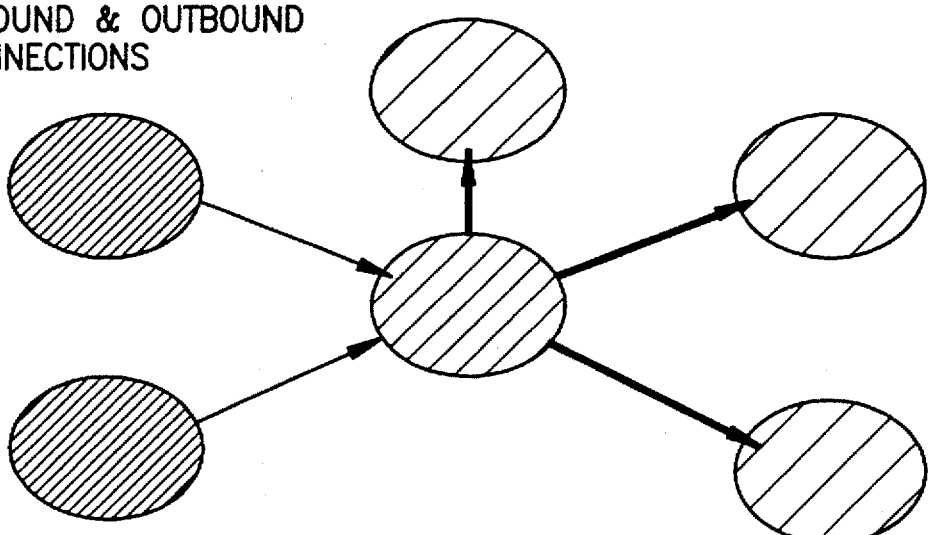
FIG. 1b, illustrates both inbound and outbound connections.
Figure 2:
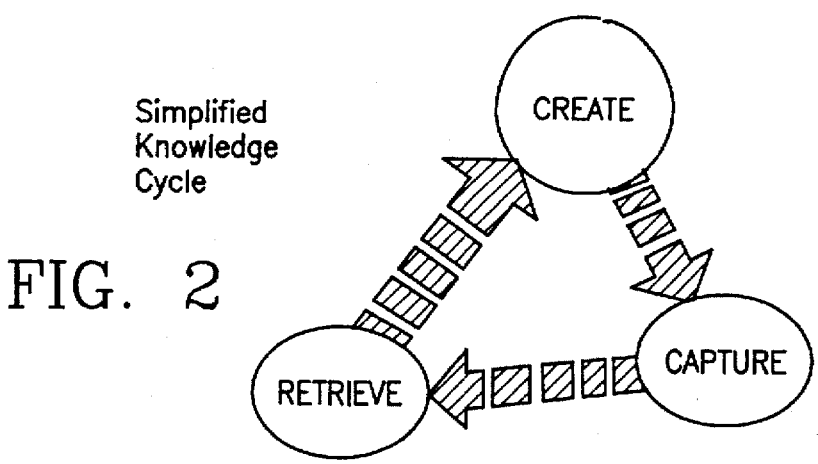
FIG. 2, illustrates a simplified knowledge cycle.

FIGS. 1a, 1b, 1c and 1d, graphically illustrate the various forms of connections. It may be convenient to conceive of the concepts of the system in terms of graph theory. FIG. 1a, illustrates that phenomena are the nodes and the Connections are unidirectional edges between origination and destination phenomena. FIG. 1b, illustrates that when discussing one particular phenomena, connections are either inbound or outbound. FIG. 1c, illustrates that connections may lead from a first Phenomena to other Phenomena which are related. A user may interchangeably look at a smaller or larger set of connected phenomena as illustrated by FIG. 1d. This idea is closely related to tree structures where vertical traversal produces a greater number of branches in one direction and less in the opposite direction.

Connections are not simply a road-map from a Phenomena to all other Phenomena. More specifically, Connections represent an observation of related Phenomena made by human or by computer observers (ref. GRINDING). The nature of these relationships will be discussed further hereafter.

The purpose of Connections is to expose the user to those Phenomena which will be beneficial in the understanding of the current Phenomena. Other Phenomena which do not aid in the understanding of the current Phenomena are excluded because no Connection exists. This allows the user of the system to successfully navigate through the universe of Phenomena and to selectively observe those Phenomena useful to acquire knowledge on a subject. (ref. CONNECTION SERVER)

Although Phenomena are the delivery mechanism for knowledge and Connections are the navigational mechanism, a problem still exists. It is entirely possible that from a given Phenomena, there may be Connections to more Phenomena than the user has time to experience. The user would like a presentation of the Connections ordered such that the most valuable Phenomena would automatically be presented first (ref. PERSONA). Other progressively less valuable Phenomena could be observed as time allows. To efficiently categorize and order the Connections, additional information about each Connection is needed in form of Connection Attributes.

Connection Attributes: In the logical structure of the system, "Connection Attributes" allow the entire network of Phenomena and Connections to become usable to each user of the system. Connection Attributes store the rationale behind each connection. In the above laptop computer example, the connection attributes would characterize the relationship between the technical description and the article, reflecting the associated quality or lack thereof of the laptop computer as perceived by the observer of the particular created connection. With the ability to store and retrieve the rationale for the existence of a Connection to a Phenomena, each user can prejudge via computation whether or not to actually have the Phenomena presented.

In fairly generic terms, Connection Attributes describe the Who, What, Where, When and Why of a particular observation. Examples of taxonomies and how this is done are discussed in the PERSONA application.

The Connection Attributes are stored in such a way that a user can view them directly to determine whether or not to observe the Phenomena(reference METHOD FOR STORING AND RETRIEVING HETEROGENEOUS CLASSIFICATION SYSTEMS). The Connection Attributes are also stored in such a way that a computer can process them to access the value of the phenomena and order them for the user. (ref. PERSONA)

Connections bearing Connection Attributes represent a judgement of an observer, or agent acting on behalf of an observer, of why two Phenomena are related. Through Connection Attributes an observer can record their rationale for Connecting the Phenomena. Future observers may use this as the basis for determining the value of the Connected Phenomena. This allows the future observer to judge whether or not to retrieve (and to experience) a Phenomena. This judgement can be done manually by the user or can be done automatically by computer programs (ref. PERSONA)

Noumena: Another concept in the logical structure of the system is "Noumena". Again borrowing from the realm of Philosophy, noumena are that which lie beyond the realm of human perception. They are the "things-in-themselves" in contrast to things as they appear.

In computer-based systems, such as the instant invention, those things which are the "things-in-themselves", rather than the things as they appear, are the computer stored data, examples are "computer files" or "datasets". When these computer files, the Noumena, are observed in their "raw" form, they do not resemble pictures, sounds, nor words. These Noumena resemble a series of bits, bytes, or numbers. These computer files must be manipulated by computer programs, "Phenominated", to alter the "things-in-themselves" into things as they appear to the observer. In the present system, Noumena are all of the computer files needed to produce a representation of a Phenomena. This includes the computer data files as well as the computer program files.

There is a distinction made between Phenomena and Noumena. In the system there is architectural independence between how the Phenomena are managed and how the Noumena are managed. The architectural independence allows maximum flexibility in implementation of the system. Computer programs which produce Phenomena from Noumena need not know the management of the underlying Noumena. These programs concentrate on how the user perceives the Phenomena.

Computer programs which manage the storage of Noumena need not know how to produce Phenomena from the Noumena. An audio sequence of words and music can be stored as a series of ones and zeros. This sequence can then be retrieved through differing software programs. A music interface might represent the sequence as an audio selection to be heard by the user. Music teaching software might represent the sequence graphically as a sequence of notes. A computer interface for the deaf might represent this sequence in words to be illustrated on a computer display.

These Noumena managing programs concentrate on optimizing the accessibility of the Noumena. They must strike a balance between access time and storage costs. A few of the techniques used by these programs include: Normalization of the storage format which is easily transformable to/from the storage format expected by different "Phenomenators". Compression of the storage format to reduce the cost of storage while keeping the cost of decompression low. Encryption may be implemented to protect sensitive knowledge. Selection of proper computer storage device which meets the needs of access times, frequency of use, and storage cost(ref. NOUMENA SERVER).

Usage

The concepts of the system are used in the following manner during knowledge creation, capture, and retrieval:

Creation: During knowledge creation, the system facilitates automation. Historically, knowledge creation was exclusively in the domain of human mental activity. Within the system, one form of automated knowledge creation is known as "Grinding", where the computer acts as a surrogate for a human observer. In brief, Grinding is a systematic, computer-based observation of Phenomena. This is done with a "narrow view". The programs are usually looking for well defined criteria. When Phenomena are observed by the computer programs, the programs make Connections between the observed Phenomena and other Phenomena known by the programs. In effect, acting as a human observer would when viewing a Phenomena and manually Connection it to other Phenomena. (ref. GRINDING)

Capture: During knowledge capture, the human or computer observer Connects two Phenomena and provides the rationale for the Connection by supplying Connection Attributes. In its simplest case, the observer Connects two Phenomena which are already in the system. In the next case, the observer identifies a new Phenomena which lies within an existing Phenomena, i.e. the underlying noumena is already in the system. The user connects the newly identified Phenomena to a previously existing Phenomena. The final case is where the observer identifies a new Phenomena which requires a new noumena introduced into the system. The user can then Connect the new Phenomena to previously existing Phenomena.

Retrieve: During knowledge retrieval, an observer navigates from Phenomena to Phenomena via Connections. Knowledge is delivered by experiencing the reconstituted Phenomena. Which knowledge is delivered is controlled by the Connections and the assessment of the Connection Attributes, preferably under the auspices of a Persona.

Benefits of the present invention include, but are not limited to:

Facilities are provided to identify and establish context for multi-media information on a universal scale. Prior systems have been limited and generally dealt with text.

The Logical model supports use by people separated by space and time. They are not required to know of each others existence, yet benefit from each others knowledge contributions.

In order to support the chaotic nature of knowledge acquisition, minimal rules are imposed. The objective is to facilitate the widest possible diversity of data, operations, connections, attributes supported, growth . . . etc.

There can be many relationships between pieces of information (Phenomena). These Connections can have single or multiple attributes. Associated with each Connection is a set of Connection Attributes which describe the relationship. The nature and basis of the Connection Attributes may be user specified for each Connection.

The Logical model supports relationships with multiple attributes between two Phenomena (objects), via multiple Connections or a single Connection with multiple Connection Attributes. Each type of Connection is useful, so both are supported. Connections are unidirectional, from one Phenomena to another Phenomena.

Independence of Connections

Connections are independent of Phenomena type (i.e. video audio, computer data, etc.). This allows heterogeneous Phenomena to be related.

Connection Attributes are independent of Phenomena type this allows relationships between heterogeneous Phenomena to be described.

Connections can be made without the presence of the actual Noumena which allows Connections to be made to Noumena which are not stored locally.

Connection Attributes provide the "meta-data" required to intelligently navigate through the graph of connected Phenomena. The attribute-bearing connection is a key differentiator from base graph theory and Entity-relationship models.

Matching of Phenomena characteristics is the primary method for the discovery of Connections with their accompanying Connection Attributes in the system. Examples of Phenomena characteristics to be matched are time and place.

The logical model of the system allows redundancy in Phenomena, Connections, Connection Attributes, and/or Noumena. This allows an implementation of the system to handle the moving of computer systems, the copying and moving of data, as well as multiple users inserting the same Phenomena, Noumena, or Connections. To avoid collision and migration problems of past systems, the system exploits the previously discussed novel Tag architecture, allowing universally unique object naming.

The logical model of the system allows architectural process independence. This allows an implementation of the system to have structural independence of most processes. This enables exploitation of computers that may be loosely coupled, multi-threaded and/or support parallel processing.

The system may be implemented as a single location (node) or as a network of connected locations (nodes). The user may seamlessly access knowledge for which they are authorized, anywhere in the system, to which they are connected. The logical model supports this distributed access and configuration.

The logical model of the system allows additional value to be derived from today's data. A key objective of the system is to coexist well and complement the existing data processing systems. It can preserve the investment in current data processing systems and facilities by "logically bolting on" and leveraging all the time and work that has been invested in capturing the current commercial information bases. This result is novel for hypermedia type systems.

The logical model supports the delivery of knowledge service with the minimum effort to find the knowledge of most interest with least cost and delay. The logical model allows searches to be performed bounded by the locality of reference (connected Phenomena). This has been done on a small scale previously. In terms of the number of users and volume of objects, this is new.

The system exploits the Tag architecture to produce Tags to identify phenomena external to the system, and serve as references, or keys, back into the system.

DETAILED DESCRIPTION OF THE PREFERRED EMBODIMENT

Figure 3:
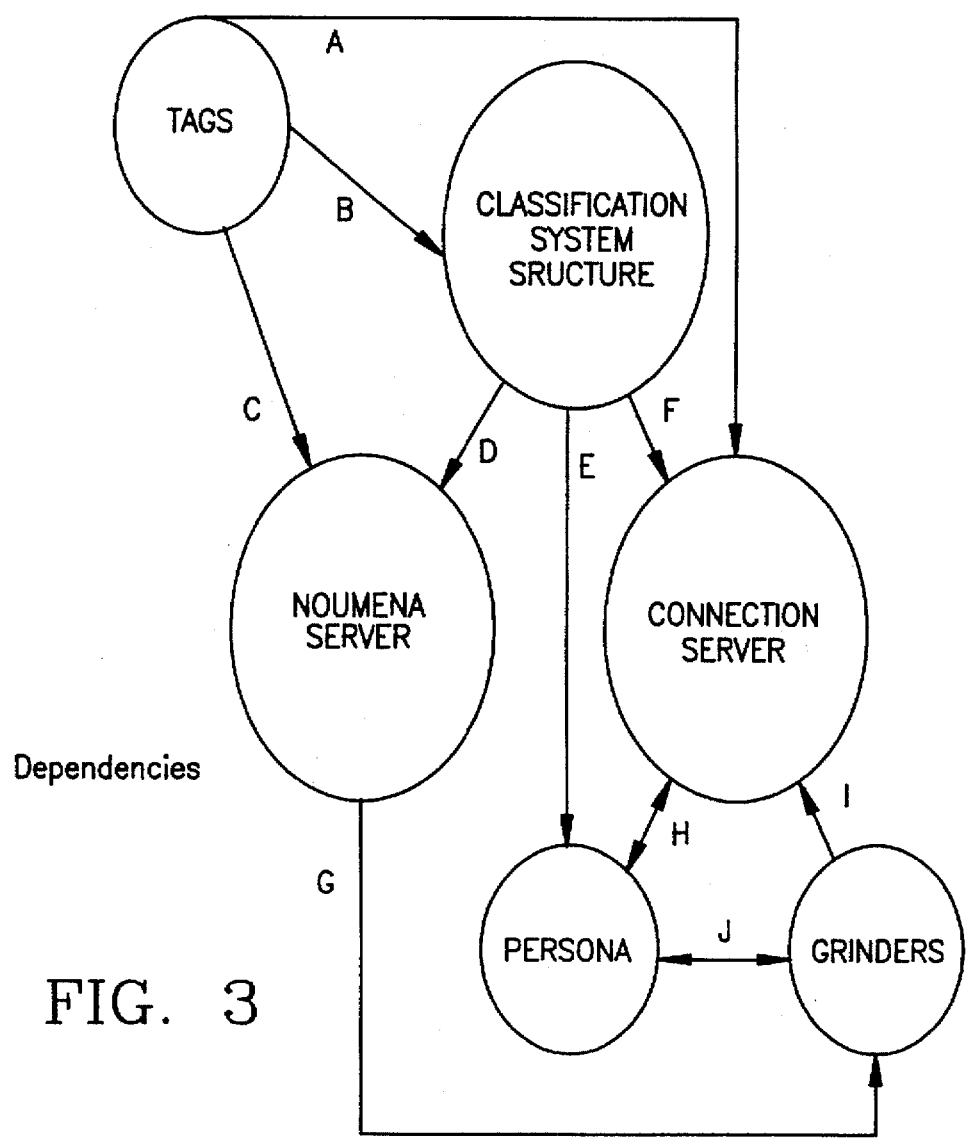
FIG. 3, illustrates the overall system configuration and its dependencies.

The synergy of the concepts of the present invention and the cooperation of the components of the physical structure of system will be discussed within the context of user operations. The concepts, as previously defined, are: Phenomena, Noumena, Connections, Connection Attributes. FIG. 3 illustrates the components of the system: Connection Server, Noumena Server, Classification System Structures, Tags, Persona, and Grinders.

To allow for recognition of all possible sources of data, each source (i.e. report, article, book, audio recording, multimedia or computer data) is first coded, and thereafter identified, with a "Tag". The Tag is a symbolic link and is used by the system to identify the data source.

The Connections Server exploits Tags(element A) to provide globally unique names for Phenomena and Connections. This allows Phenomena and Connections to be moved or replicated from one Connection Server to another without naming conflicts.

Connection Server utilizes Classification system structures to efficiently organize and store Connection Attributes. (see element F)

Connections Server utilizes Persona to determine the value of each Connection so that the user can cope with potentially large number of Connections emanating from a Phenomena. The ability to deliver the knowledge in "priority" order increases the value of the Connection Server data. (see element H)

Connection Server benefits from Grinders because they produce large numbers of Connections which otherwise may never be manually observed and recorded. (see element I)

Classification System Structures exploits Tags in that Attributes can be uniquely defined and used independently of all other Attributes previously defined without conflict. (see element B)

Noumena Server exploits Tags to provide globally unique names for Noumena. This allows Noumena to be moved from one Noumena Server to another without naming conflicts. (see element C)

Noumena Server utilizes Classification System Structures to efficiently organize and store Noumena Attributes. (see element D)

Persona depends on the Connection Server to provide the collection of Connections which emanate from the current Phenomena. (see element H) Persona utilizes Classification System Structures to provide the Connections Attributes which will be evaluated by the Persona. (see element E)

Persona and Grinders cooperate in that Grinders produce massive amounts of non-subjective Connections through efficient and exhaustive automated processing. However, the quantity of Connections produced is so large that without the subjective value judgement of Persona, the output of Grinders would be overwhelming and therefore difficult to use. Conversely, Persona depend on Grinders to produce a large number Connections which might otherwise never have been observed. (see element J)

Grinders employ Noumena Servers to provide appropriate Noumena to be processed during grinding. (see element G)

Operations and Algorithms of the Logical Model

This section describes the basic set of operations defined in the logical model of the present invention.

The purpose and nature of the facilities will be described on a per operation basis.

In the preferred embodiment, all operations are atomic in nature. Either all changes are remembered or they are all forgotten (committed or rolled back). No partial changes persist in the system. The above limitation is for the preferred embodiment but is not to be limited thereto, as multiple implementations are envisioned.

The Noumena Server describes the physical management of Noumena assumed by this logical model. These operations are to include: INTRODUCE NOUMENA, UNINTRODUCE NOUMENA, and RETRIEVE NOUMENA (ref. Noumena Server).

IDENTIFY PHENOMENA (tag it) All Phenomena in the universe of the logical model of the system must be uniquely identified. This identification is done by assigning a uniquely generated token, a TAG.

The IDENTIFY PHENOMENA operator acquires a new Tag and inserts the Phenomena description (meta-data) into the Connections Server. Since Phenomena are not allowed to be disconnected (graph theory meaning), the "identify operation" requires appropriate descriptive data to allow one Connection of the newly identified Phenomena to be inserted into the Connection Server.

The operation fails if the required definition (meta-data) or the Connections data is not adequate, therefore the Phenomena is not inserted into the system.

CREATE CONNECTION: New Connections can be added to the logical model of the system. "CREATE CONNECTION" records a new edge (graph theory notation), or Connections, between two previously identified Phenomena in the Connection Server. The system also records the attributes associated with this Connection in the Connection Attributes structure in the Connection Server.

RETRIEVE CONNECTIONS: The "RETRIEVE CONNECTION" operation accepts Tags as input. The Connection Server returns to the requestor a list of symbolic pointers connections emanating from or pointing to the Phenomena identified by the input Tag. Accompanying each symbolic pointer is the corresponding collection of Connection Attributes.

RETRIEVE PHENOMENA: The "RETRIEVE PHENOMENA" operation accepts a Tag as input and returns to the requestor the meta-data needed to recreate the Phenomena. This meta-data is recorded in the Connection Server.

DELETE CONNECTION (forget relationship): Connections may be removed from the logical model of the system. This "DELETE CONNECTION" removes the specified Connection between two previously identified Phenomena and the Connection Attributes associated with this Connection.

UNIDENTIFY PHENOMENA: Phenomena in the logical model of the system may be logically deleted. This "UNIDENTIFY PHENOMENA" is logically equivalent to an removal of the phenomena in the system and the deletion using DELETE CONNECTION of all associated Connections and their corresponding Connection Attributes.

The scenario of usage of the present invention is accomplished on a computer workstation, with a graphical user interface. Most of the operators described in the following example are invoked via pull-down menus, and "point and click" designation of the operand. Thus the interface is very simple and user friendly. The user is unaware of the actual operator syntax and details underlying the system operation. An is as follows: During the workday a user connected to an instance of the system encounters an object on interest such as a technical article or photograph. The user wishes to add this object to the knowledge base and connect it appropriately.

To begin this process, the user must specify an initial connection point. The user can use the IDENTIFY PHENOMENA and INTRODUCE NOUMENA operators to cause a copy of the designated object to be sent to the Noumena Server for processing. That processing consists of a recording of the physical characteristics and location of the Noumena. The system acquires a Tag and inserts the Phenomena description (meta-data) into the logical model for the initial Connection.

Optionally, the user may wish to make additional Connections to or from the new PHENOMENA, this can be done via the CREATE CONNECTION operator.

Later, this user or some other authorized user may wish to access this knowledge. The Connections involving this Phenomena can be retrieved via the RETRIEVE CONNECTIONS operator.

The Phenomena (based on the Noumena as stored or cataloged in the Noumena Server) may be viewed via the RETRIEVE PHENOMENA operator.

The DELETE CONNECTION, UNIDENTIFY PHENOMENA, and UNINTRODUCE NOUMENA, functions are mainly for administrative use and are rarely needed.

CONCLUSION

A system and method has been shown in the above embodiments for the effective connection, storage and retrieval of information. While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A computerized system for creating an interrelationship between a plurality of local and/or remote-computer-coded datasets, comprising any of text, audio, video, images, database entries or combinations thereof, for use in developing knowledge comprising:
   a. a globally unique identifier,
   b. means incorporating said identifier to uniquely identify at least a first and second dataset from said plurality of computer-coded datasets,
   c. means for storing said unique identifiers in memory,
   d. means for interrelating said at least first and second datasets to include a connection between said first and second datasets and one or more attributes describing said connection,
   e. means incorporating said identifier for uniquely identifying both said connection and said one or more attributes,
   f. means for storing said connection and attribute(s) identifiers,
   g. means for repeatedly creating said interrelationships by invoking a-d for a plurality of datasets,
   h. data accessing means for storing and retrieving a canonical form of said at least first and second datasets,
   i. interface means for providing to a user of said system a list of prioritized linked datasets based on a profile related to said user or said datasets, and
   wherein said list is developed based on said created interrelationships as they relate to said profile.

2. A computerized system as per claim 1, wherein said system stores a plurality of interrelationships for at least said first and second datasets.

3. A computerized system as per claim 2, wherein said interrelationships are created by the user based on one or more subjective criteria.

4. A computerized system as per claim 2, wherein said interrelationships are created automatically based on one or more predetermined criteria.

5. A computerized system as per claim 2, wherein said interrelationships are created automatically based on one or more heuristic criteria.

6. A computerized system as per claim 1, wherein said interrelating of datasets is independent of dataset type.

7. A computerized system as per claim 1, wherein said means for storing identifiers is remote/local.

8. A computerized system as per claim 7, wherein said identifiers are accessible by networks.

9. A computerized system as per claim 1, wherein said means for storing interrelationships is remote/local.

10. A computerized system as per claim 9, wherein said means for storing interrelationships is accessible by networks.

11. A computerized method for the creation of associations between heterogeneous datasets comprising:
   a. uniquely identifying at least a first and second dataset from said heterogeneous datasets;
   b. storing said unique identifiers in memory;
   c. identifying a relationship between said at least first and second datasets;
   d. uniquely identifying and storing said relationship;
   e. repeatedly creating said relationships by invoking a-d for a plurality of datasets;
   storing and retrieving a canonical form of said at least first and second datasets, and
   developing a list of prioritized linked datasets based on matching and sorting said relationships created in coaction with one or more user reflective criteria.

12. A computerized method as per claim 11, wherein said datasets are located within a users workstation and/or are remote from said workstation.

13. A computerized method as per claim 12, wherein said datasets located remote from said workstation are accessible through computer networks.

14. A computerized method as per claim 11, further comprising storing a plurality of relationships for at least said first and second datasets.

15. A computerized method as per claim 14, wherein said relationships are created by the user based on one or more subjective criteria.

16. A computerized method as per claim 14, wherein said relationships are created automatically based on one or more predetermined criteria.

17. A computerized method as per claim 14, wherein said relationships are created automatically based on one or more heuristic criteria.

18. A computerized method as per claim 11, wherein said datasets may be of differing types.

19. A computerized method as per claim 18, wherein said dataset types may include at least any of the group comprised of: text data, video, audio, database entries, images.

20. A computerized method as per claim 11, wherein said identification of a relationship between datasets is independent of dataset type.

21. A computerized system as per claim 11, wherein said means for storing identifiers is remote/local.

22. A computerized system as per claim 21, wherein said identifiers are accessible by network.

23. A computerized system as per claim 11, wherein said means for storing relationships is remote/local.

24. A computerized system as per claim 23, wherein said means for storing relationships is accessible by networks.

25. A computerized method for the association of heterogeneous datasets dispersed across computer networks comprising:

a. uniquely identifying at least a first and second dataset from said heterogeneous datasets;
   b. storing said unique identifiers in memory;
   c. identifying a relationship between said at least first and second datasets;
   d. uniquely identifying and storing said relationship;
   e. storing a description of said relationship, and
   f. repeatedly creating said relationships by invoking a-e for a plurality of said datasets dispersed across networks.

26. A computerized method as per claim 25, further comprising the step of developing a list of prioritized linked datasets based on matching and sorting said relationships created.

27. A computerized method as per claim 26, wherein said prioritized linked datasets are developed using one or more selected criteria.

28. A computerized method as per claim 26, further comprising the steps of selecting datasets from said list of prioritized linked datasets and retrieving said selected datasets by accessing a generic form and its corresponding datatype.

29. A computerized method as per claim 25, further comprising storing a plurality of relationships for at least said first and second datasets.

30. A computerized method as per claim 25, wherein said relationships are created by a user based on one or more subjective criteria.

31. A computerized method as per claim 25, wherein said relationships are created automatically based on one or more predetermined criteria.

32. A computerized method as per claim 25, wherein said relationships are created automatically based on one or more heuristic criteria.

33. A computerized method as per claim 25, wherein said datasets may be of differing types.

34. A computerized method as per claim 33, wherein said dataset types may include at least any of the group comprised of: text data, video, audio, database entries, images.

35. A computerized method as per claim 25, wherein said identification of a relationship between datasets is independent of dataset type.

36. A computerized method as per claim 25, wherein said description of said relationship is independent of datatypes of said first and second datasets.

37. A computerized system as per claim 25, wherein said datasets are located within the system and/or remote from the system.

38. A computerized system as per claim 37, wherein said datasets located remote from the system are accessible through computer networks.

39. A computerized system as per claim 25, wherein said means for storing identifiers is remote/local.

40. A computerized system as per claim 39, wherein said identifiers are accessible by network.

41. A computerized system as per claim 25, wherein said means for storing relationships is remote/local.

42. A computerized system as per claim 41, wherein said means for storing relationships is accessible by networks.

43. A computerized method as per claim 25, wherein said description is remote/local.

44. A computerized method as per claim 43, wherein said description is accessible by network.

* * * * *

UNITED STATES PATENT AND TRADEMARK OFFICE
CERTIFICATE OF CORRECTION

PATENT NO. : 5,745,895
DATED : April 28, 1998
INVENTOR(S) : Bingham et al.

It is certified that error appears in the above-identified patent and that said Letters Patent is hereby corrected as shown below:

IN THE ABSTRACT

Line 2, after "information" insert - - . - -.

Column 1, Line 35, delete [08/272,022] and insert therefore - - 08/267,022 - -.

Column 1, Line 36, delete [U.S. Pat. No.] and insert therefore - - Ser. No. - -.

Column 1, Line 56, after " retrieval)" insert - - . - -.

Signed and Sealed this

Tenth Day of November 1998

Attest:

BRUCE LEHMAN

Attesting Officer

Commissioner of Patents and Trademarks